United States Patent Office 3,594,466
Patented July 20, 1971

3,594,466
IMMUNOLOGICAL TEST SYSTEM AND PROCESS FOR PREPARING SAME
René Auguste Denis Guffroy, Lille, Nord, France, assignor to Laboratoires Polypharma, Ile-Saint-Denis, Seine-Saint-Denis, France
No Drawing. Filed Oct. 24, 1966, Ser. No. 588,747
Claims priority, application France, Apr. 19, 1966, 58,156
Int. Cl. G01n 33/16
U.S. Cl. 424—12
5 Claims

ABSTRACT OF THE DISCLOSURE

A stable diagnostic for rheumatoid arthritis is provided by processing red blood cells, processing a hemolytic antiserum to the red cells, and formolating and combining the red cells and the hemolytic antiserum.

---

This invention relates to the preparation of an immunological test system whereby, inter alia, a fast detection of the rheumatoid factor can be carried out, for example, on a glass slide, for diagnosis of the rheumatoid arthritis. More particularly the invention provides such a test system which is in a stable form and can be stored for lengthy periods while securing faithful and reliable analysis results.

It is known that the rheumatoid factor shows haemagglutination properties when in the presence of a complex system including red blood cells antigens and their corresponding iso- and hetero-immune sera, that is to say when in the presence of complex systems of red blood cells antigens-soluble antibodies.

This haemagglutination property is a well known one and the rheumatoid factor of the rheumatoid arthritis can already be detected by an in vitro reaction according to which this factor is contacted with a highly unstable system that can only be prepared just before use. This system, in fact, comprises fresh red cells and a hemolytic sensitizer serum which is an iso- or hetero-immune serum corresponding to the red cells in question. It is known that fresh red cells cannot be stored as such and that, on the other hand, the sensitizer serum is only stable when stored in sterile vials or ampules. The whole system so prepared (fresh red cells+antiserum) is itself unstable and must be used immediately for analysis purposes.

Now, the present invention provides a stable test system of the above described type that can be stored during long periods of time and whereby the so-called "Waaler-Rose reaction," or the derived reactions based on agglutination properties of the rheumatoid factor, can be rapidly carried out without need for a previous preparation or treatment.

The test system according to this invention comprises essentially a system including a formaldehyde-treated complex of cell antigen-soluble antibody.

Another object of this invention is to provide a process for preparing such a test system, which process is essentially characterised in that it comprises the steps of processing red cells, processing a hemolytic serum, formolating and combining said red cells and said hemolytic serum.

This invention is based on the fact that it was until now considered impossible to conceive a stable association of red cells and antiserum, which led those skilled in the art to prepare the red cells and the anti-serum separately and to mix them only when they are required for immediate use. Unexpectedly, the complex system according to this invention remains stable during at least one year when the system is stored at +4° C.

According to other features of the invention, the complex system of the invention can be obtained from any red cells and any sensitizer hemolytic serum including those listed hereinbelow:

| Red cells | Sensitizer sera. |
|---|---|
| A or B | Iso immune anti A or anti B serum. |
| O Rh+ | Anti Rh serum. |
| Sheep | Rabbit anti sheep. |
| Do | Rabbit anti goat. |
| Goat | Do. |
| Do | Rabbit anti sheep. |
| Ox | Rabbit anti ox. |
| Guinea pig | Rabbit anti guinea pig. |
| Hen | Rabbit anti hen. |
| Sheep | Guinea pig anti sheep. |
| Do | Horse anti sheep. |
| Mouse | Rabbit anti mouse. |
| Guinea pig | Rabbit anti guinea pig. |
| Sheep | Guinea pig anti sheep. |
| Horse | Guinea pig anti horse. |
| Ox | Guinea pig anti ox. |
| Sheep | Sheep iso immune serum. |
| Do | Goat anti sheep. |
| Cynocephalus | Rabbit anti cynocephalus. |
| Cat | Rabbit anti cat. |

The system comprising human red cells O-serum of rabbit anti-human red cells has been found particularly interesting according to tests carried out on this complex system.

Other features and the advantages of this invention will be more clearly seen from the following description:

(1) Processing of the red cells

As an illustration, this example is given for the case of processing red sheep cells. The same procedure can indeed be applied to the case of red cells from other sources (see the above table):

The blood of a sheep is aseptically withdrawn on an anticoagulation agent such as ethylenediamine tetraacetic acid (E.D.T.A.) (also known under the designation "Complexon III") at 1 g. percent in saline solution containing 9 g. per thousand of NaCl. Other anticoagulation agents can be used, such as sodium citrate.

The freshly collected cells (9 volumes for 1 volume of E.D.T.A.) are immediately washed four times with saline solution (9 g. NaCl/liter). If supernatant liquid still shows hemolysis, (this can be checked on a colorimeter at 530 m$\mu$), one or more additional washes are carried out.

The red cells are finally suspended at 10% in saline solution.

(2) Processing of hemolytic serum of rabbit anti-sheep

The red sheep cells prepared as described hereinabove, are diluted with half their volume of saline solution.

A rabbit is subjected to from 7 to 8 intravenous injections at four-day intervals in the following manner:

The first injection is of 5 ml. of these red cells, the next three are of 2 ml. and the remainder are of 1 ml.

After the titer or level of the serum has been checked, the blood of the animal is extracted through a puncture at the carotid, one week after the last injection.

When the blood is clotted, the serum is collected and heated to 56° C. in order to destroy the complement.

The serum is then stored in sterile ampules at +4° C.

(3) Production of the test system according to this invention

To one volume of red cells suspended at 10% in an anti-sheep serum (as prepared hereinabove), itself diluted with saline solution up to an agglutination level between one-half and one-fifth of the original level, is added one volume of formaldehyde as a 1% solution in saline solution (the formaldehyde solution used is a 40% solution previously neutralized to pH 7.2 with a solution of 1 N NaOH).

The solution is incubated with slow and continuous agitation during two hours at 20° C., then during at least five hours at 37° C.

Two washings are then carried out with saline solution. Between each washing the cells are separated by centrifuging (2000 r.p.m.). This incubation operation in presence of formaldehyde leads to the red corpuscles being sensitized by the anti-sheep serum.

The sensitized and isolated red cells are then suspended in saline solution up to a concentration of 10%.

This system is then treated with formaldehyde at a temperature of not greater than 37° C. following procedures usually applied in biochemistry and particularly those used for stabilizing freshly isolated red cells.

The formaldehyde-treated complex system so prepared is then washed with saline solution and centrifugation (2000 r.p.m.).

The system is then put again into solution at 10% in saline solution containing 1 part per thousand of formaldehyde.

The test system is then ready for use.

It can be stored in a closed and sterile vial for at least one year at +4° C.

For analyzing the blood of a patient in order to detect the rheumatoid factor, the procedure is the same as that usually applied with freshly prepared test systems, by using the so-called "Waaler Rose Reaction," or deriving reactions based upon agglutination properties of the rheumatoid factor, that is to say that a drop of the serum of the patient is contacted with the test system on a glass slide. If agglutination occurs, the presence of the rheumatoid factor is ascertained. When this factor is not present, there is no agglutination. The test is more suitably carried out in the presence of a control which does not react in the presence of the rheumatoid factor. On the other hand, one can add one drop of the reagent to a test tube containing the patient's serum suitably diluted. The appearance of a sedimentary ring reveals the presence of the rheumatoid factor.

It will be understood that the foregoing description is given only in order to explain the invention more clearly without limiting it in any way and that any useful modification can be made thereto without departing from the scope of the invention.

In particular, the test system according to this invention can also be stored as a lyophilized system derived from freeze-drying the formaldehyde treated suspension prepared as described hereinabove under vacuum (at a temperature between −5° C. and −20° C.). For further use as a test system, the said lyophilized form need only be suspended again in a saline solution.

One can also foresee using the test system in an immunofluorescence procedure, after addition of a dye such as fluorescein isothiocyanate, this latter procedure facilitates the reading of microscopic agglutinations and permits the rheumatoid factor to be observed at the tissue level.

I claim:

1. Process for preparing a test system for revealing the rheumatoid factor comprising:
aseptically withdrawing blood from a first animal onto an anticoagulation agent;
washing the freshly collected blood cells;
suspending the washed red cells in a saline solution;
injecting a first portion of said suspended red cells into a second animal of different blood type from said first animal;
collecting blood from said second animal after a high antibody level has resulted;
collecting serum from the blood after it has clotted and heating said serum to destroy the blood complement to provide a hemolytic serum;
mixing together a second portion of said suspended red cells, formaldehyde and said hemolytic serum;
incubating the mixture to sensitize said red cells;
isolating the sensitized red cells; and
stabilizing said isolated cells with additional formaldehyde;
said red cells being selected from the first column of the following table, and said hemolytic serum being selected from the second column of said table adjacent to the member selected from the first column:

| Red cells: | Hemolytic serum |
|---|---|
| A or B | Iso immune anti A or anti B serum. |
| O Rh+ | Anti Rh serum. |
| Sheep | Rabbit anti-sheep. |
| do | Rabbit anti-goat. |
| Goat | Do. |
| do | Rabbit anti-sheep. |
| Ox | Rabbit anti-ox. |
| Guinea pig | Rabbit anti-guinea pig. |
| Hen | Rabbit anti-hen. |
| Sheep | Guinea pig anti-sheep. |
| do | Horse anti-sheep. |
| Mouse | Rabbit anti-mouse. |
| Horse | Guinea pig anti-horse. |
| Ox | Guinea pig anti-ox. |
| Sheep | Sheep iso-immune serum. |
| do | Goat anti-sheep. |
| Cynocephalus | Rabbit anti-cynocephalus. |
| Cat | Rabbit anti-cat. |
| Human O | Rabbit anti-human. |

2. A test system for use in revealing the rheumatoid factor, said test system being produced in accordance with the process of claim 1.

3. Process in accordance with claim 1 wherein said anticoagulation agent comprises ethylenediamine tetracetic acid in saline solution; wherein said washing of said freshly collected blood is carried out using saline solution; wherein said injection of suspended red cells into a second animal is carried out several times over several weeks; wherein said heating of said serum from the coagulated blood of said second animal is carried out at about 56° C.; wherein said mixing together a second portion of said suspended red cells, formaldehyde and said hemolytic serum comprises adding to one volume of said red cells suspended at about 10% in said hemolytic serum diluted with saline solution to an agglutination level between ½ and ⅕ of the original level, about one volume of said formaldehyde at about 1% in saline solution; wherein said incubating said mixture to sensitize said red cells is carried out for several hours at up to about 37° C., followed by washing the resultant sensitized red cells with saline solution; wherein said isolation of said sensitized red cells is followed by suspending said sensitized red cells in a saline solution up to a concentration of 10%; and wherein said stabilizing said isolated cells with additional formaldehyde comprises treating the sensitized red cells with formaldehyde at up to 37° C., washing, dissolving in saline solution containing 1 part/1000 of formaldehyde to provide about a 10% solution.

4. A method in accordance with claim 3 further comprising freeze drying said stabilized isolated cells under vacuum at from −5° C. to −20° C.

5. A process according to claim 1 wherein said red blood cells comprise human red cells O and said hemolytic serum comprises the serum of rabbit anti-human red cells.

References Cited

UNITED STATES PATENTS

| | | | |
|---|---|---|---|
| 3,096,250 | 6/1963 | Ingraham | 424—12 |
| 3,322,634 | 5/1967 | Fulthorpe | 424—12 |

OTHER REFERENCES

Singer et al., American Journal of Medicine, vol. 21, December 1956, pp. 888–892.

Rheins et al., PSEBN, vol. 96, October 1957, pp. 67–71.

ALBERT T. MEYERS, Primary Examiner

D. M. STEPHENS, Assistant Examiner